(12) United States Patent
Jackson et al.

(10) Patent No.: US 10,137,602 B2
(45) Date of Patent: Nov. 27, 2018

(54) FABRICATING A ROBOTICS SKIN SYSTEM USING A MOLD CORE OR TOOL DEFINING AN INVERSE OF AN EXTERIOR SURFACE TOPOGRAPHY

(71) Applicant: DISNEY ENTERPRISES, INC., Burbank, CA (US)

(72) Inventors: Philip John Jackson, Glendale, CA (US); Maeis Heshmati, Tujunga, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 481 days.

(21) Appl. No.: 14/734,651

(22) Filed: Jun. 9, 2015

(65) Prior Publication Data
US 2016/0361844 A1   Dec. 15, 2016

(51) Int. Cl.
| B29C 33/38 | (2006.01) |
| B29C 37/00 | (2006.01) |
| B29C 39/02 | (2006.01) |
| B29C 41/14 | (2006.01) |
| B29L 31/00 | (2006.01) |

(52) U.S. Cl.
CPC ...... *B29C 33/3835* (2013.01); *B29C 37/0032* (2013.01); *B29C 39/02* (2013.01); *B29C 41/14* (2013.01); *B29C 2037/0035* (2013.01); *B29L 2031/7532* (2013.01)

(58) Field of Classification Search
CPC .................................................. B29C 33/3835
See application file for complete search history.

(56) References Cited

U.S. PATENT DOCUMENTS

| 3,405,026 A | 10/1968 | Roberts |
| 4,551,297 A | 11/1985 | Botcher et al. |
| 4,661,187 A | 4/1987 | Beasley |
| 5,211,894 A | 5/1993 | Groh et al. |
| (Continued) | | |

FOREIGN PATENT DOCUMENTS

KR       101516077 B1  *  4/2015

OTHER PUBLICATIONS

Jon R. Lesniak, et al, "New Coating Techniques in Photelasticity," Retrieved from: http://www.stressphotonics.com/PSA/psa_pdfs/SEM99_Coating.pdf; p. 1, col. 2-12; Jun. 7-9, 1999.

*Primary Examiner* — Ryan M Ochylski
(74) *Attorney, Agent, or Firm* — Marsh Fischmann & Breyfogle LLP; Kent A. Lembke

(57) ABSTRACT

A method for fabricating an artificial skin system such as skin for use with a robotics assembly. The method includes forming or accessing a digital three dimensional (3D) model of an object. The digital 3D model defines a topography of an exterior surface of the object. The method includes processing the 3D model to generate a 3D model of a core, including defining an exterior surface of the core with a topography that is an inverse copy of the topography of the exterior surface of the object. The method includes fabricating the core based on the core model, whereby the core has an exterior surface corresponding to the exterior surface of the core model. The core is used in dipping processes or injection molding processes to form a skin in which the exterior surface is formed of material that abutted the inverse topography of the exterior surface of the core.

15 Claims, 11 Drawing Sheets

(56) References Cited

U.S. PATENT DOCUMENTS

| | | |
|---|---|---|
| 5,258,037 A | 11/1993 | Caspers |
| 5,527,359 A | 6/1996 | Nakamura et al. |
| 6,905,390 B2 | 6/2005 | Fukui et al. |
| 7,162,322 B2 | 1/2007 | Arbogast et al. |
| 7,393,485 B2 | 7/2008 | Yourist |
| 7,718,105 B2 | 5/2010 | Tye et al. |
| 7,740,953 B2 | 6/2010 | Jackson et al. |
| 8,086,336 B2 | 12/2011 | Christensen |
| 8,568,642 B2 | 10/2013 | Jackson et al. |
| 2008/0032136 A1 | 2/2008 | Vissing et al. |
| 2010/0102476 A1* | 4/2010 | Higgins ............... B29C 33/3835 264/219 |
| 2011/0087351 A1 | 4/2011 | Sachdeva et al. |
| 2011/0087354 A1* | 4/2011 | Tye ......................... A63H 9/00 700/98 |
| 2012/0185218 A1 | 7/2012 | Bickel et al. |
| 2012/0329008 A1 | 12/2012 | Fishman et al. |
| 2014/0010994 A1 | 1/2014 | Choi et al. |
| 2014/0043328 A1* | 2/2014 | Chen ...................... G06T 17/00 345/419 |
| 2014/0368621 A1* | 12/2014 | Michiyama ........ H04N 5/23216 348/50 |

\* cited by examiner

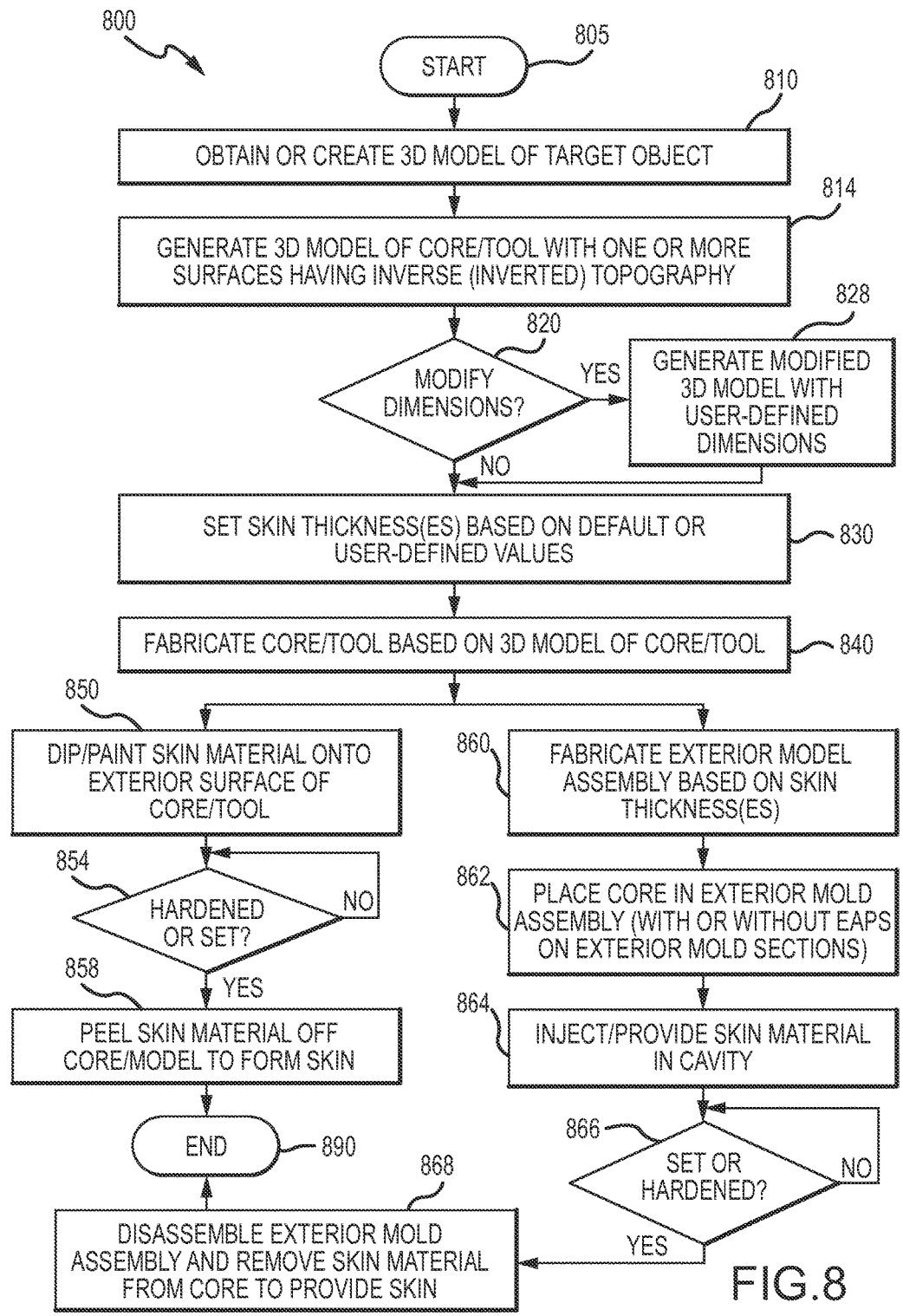

FABRICATING A ROBOTICS SKIN SYSTEM USING A MOLD CORE OR TOOL DEFINING AN INVERSE OF AN EXTERIOR SURFACE TOPOGRAPHY

BACKGROUND OF THE DESCRIPTION

1. Field of the Description

The present description relates, in general, to creating realistic skin or skin systems for robots or for use with robotics or other applications in which skin or similar coverings are applied (e.g., robotics used to simulate movement of a human's or a character's face, hands, or the like). More particularly, the description is directed to an efficient (e.g., less time consuming and costly) and readily scalable method of fabricating skin systems (and skins formed using such methods) for applying over robotics, and the methods are suited for producing skins or skin systems with detailed and, often, fine exterior surface topologies and/or features.

2. Relevant Background

Durable materials that are often also flexible and elastic such as plastics and rubbers are used in many applications to create coverings or skins that are applied over an internal physical support structure or skeleton. For example, skins or skin systems are used to create realistic models of humans, animals, and characters, and when combined with robotics, such models may accurately simulate live beings.

Robotics involves the design and use of robots such as to provide programmable actuators or drivers to perform tasks without human intervention, and there have been significant demands for robotic devices (or robots as these terms may be used interchangeably) that simulate humans, animals, and other living beings or characters. These robotic characters are relied upon heavily in the entertainment industry such as to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or another triggering event.

It is likely that the interest in robotics will continue to expand in the coming years, and a growing area of interest is how to provide robots that appear more realistic. Many robotics companies have focused on creating robots with software, processing hardware, and mechanical actuators or drivers that allow the robots to behave more like the natural creature that is being simulated. Much work has been done to create robots that can move and even behave similar to humans such as by manipulating objects with mechanical assemblies that behave like hands configured to be human-like. Significant effort has also been directed to providing robots with realistic facial animation such as having a robot open and close its mouth to provide lip synchronization with output audio (e.g., with speech) and by providing particular facial movements including eye movement such as frowning, smiling, and the like. While many advances have been made in realistically simulating the physical movement and facial movement of a character, problems with maintaining a realistic or desired movement or facial animation still occur when the robotics (e.g., internal components of a robot including mechanical/structural portions as well as software, hardware, power systems, and the like) are covered with a skin or skin system. For example, a robot used to simulate a particular creature would be covered with skin or a covering assembly to imitate the natural or desired covering for the creature such as skin and fur/hair for many creatures, clothes for some creatures such as humans or characters (e.g., characters from animated films or television or puppets), or more fanciful covering system such as a metallic suit or any other desired covering.

In simulating humans or human-like characters, the robotics are typically covered in a skin that is fabricated of flexible material to move naturally with the underlying robotics. The skin may be formed of a rubber material or a silicone that is attached or anchored to the mechanical actuators or drivers of the robotic system, and the skin is configured to have an outward appearance similar to the character or creature being simulated by the robot. For example, the facial skins can be formed so as to have an uncanny resemblance to the character (or person) they are imitating, but often this resemblance ends when the attached robotics begin animating the face. The connection or anchoring points become apparent as the skin is pulled or pushed from behind. Additionally, the movement may be undesirably localized with movement only at the point of attachment, whereas a human face generally stretches and contracts more as a unit (or the movement is more widespread across the face), e.g., a human's skin around their nose and eyes may move when skin around the mouth moves while a typical robotic skin may only move near the connection point with the manipulating robotics.

Currently, a skin system for a robot is made using a manual process relying on skill and experience of the craftsperson creating the skin and requiring many man-hours to prototype and later fabricate based on the prototype. In the existing process, a sculpture is created, such as from clay or other moldable/shapeable materials, to represent the exterior skin shape (e.g., a person's face, a character from a movie, and so on). The sculpture is then molded, and sheet wax or a layer of clay is laid by hand into this exterior mold to define a desired thickness for the exterior skin layer. An interior core is then fabricated by hand such as by using fiberglass and resin. An exterior skin can finally be formed by pouring a rubber or other flexible material into the gap between the exterior mold and the core mold. After it is set, the skin is removed from the molds and placed on the supporting or hard shell(s) and attached to portions of the robotics.

To enhance the appearance and realism of the skin, it may be desirable for the skin's exterior surface to have fine detail in its topography and features. For example, a skin or skin system may be fabricated to cover a robotic hand or to provide a human-like or other face for a head of a robot. In such cases, it is desirable that the exterior surface of the skin have an expected appearance such as by including lines or wrinkles similar to those found in the human or other animal or character being simulated by the robotic assembly. In a particular case, a skin system for covering a robotic hand that is intended to have a human appearance would be designed to have wrinkles and lines (e.g., wrinkles/lines about the knuckles, bumps where veins/arteries may run below the surface, fingerprints, lifelines, blemishes, and the like) and may also have features such as fingernails.

With present manufacturing processes, the exterior mold assembly is carefully machined or fabricated such that its inner surfaces (surfaces facing the inner core) provide the desired fine detail or topography/features of the skin's exterior surface. A problem arises, though, because there are two or more sections or halves of such a mold assembly that are assembled over (or that enclose) the inner core. As a consequence, when a soft skin is manufactured for a robot or other application, the soft skin has relatively large seam or part lines/ridges where the exterior mold sections mate.

These seams or part lines/ridges have to be removed by hand or the visual realism of the skin will be ruined, e.g., an observer of the robot covered by such a skin will readily spot the seam/ridge and know the robot is artificial (not the human or character being simulated) or at least perceive the robot as less realistic. This post-processing work can be very time consuming (and, as a result, expensive) as it can be difficult to clean and trim the molded skin without damaging its exterior topography and features. This clean up or finishing work can also be heavily reliant upon the artisan performing the work such that results will vary and often may not be wholly satisfactory. Hence, there remains a need for an improved method of fabricating skins or skin systems that requires less or no post-processing work while retaining high quality detail in the exterior topography and/or features of the skins or skin systems.

SUMMARY

The present description provides a method for fabricating skins (or skin systems, as these terms are used interchangeably herein) that is significantly more efficient than prior processes requiring post-processing work to clean up seam lines or ridges left by exterior molding sections. Briefly, the method involves using a digital three dimensional (3D) model of a target object (e.g., an object such as a hand, a face, or the like) and its "skin" or surfaces. This provides a definition of the desired topography (and/or 3D features) of the exterior surface of the skin to be fabricated in later fabrication steps.

Significantly, the method then involves generating a new 3D model from the original 3D model in which the topography and its 3D features (e.g., fingernails when the target object is a finger or a hand) are inverted to provide an exterior surface with an inverted topography with inverted or negative features. For example, a portion of a target object such as a finger or a face may have lines or wrinkles that are combinations of side-by-side raised and recessed areas. In the negative or inverted topography, the raised areas become recessed areas while the recessed areas become raised areas.

The method then involves fabricating, such as by machining, milling, 3D printing, or the like, a "master" or inverse mold core (or tool) based on the new 3D model of the target object. This master or inverse mold core has an exterior surface with the inverted or negative topography generated from the 3D model of the target object. The method then can proceed with fabricating a skin using the master or inverse mold core. This may involve dipping or painting a layer of liquid skin-forming material over the exterior surface of the master or inverse mold core and, once set or hardened, the material may be peeled off of the master so as to turn it inside out to provide a skin with a topography matching that of the target object on its exterior surface, with no seam lines or defects that would require further processing. In other cases, the master or inverse mold core is positioned within an exterior mold assembly (e.g., two exterior mold halves) and liquid skin-forming material is injected into the cavity surrounding the exterior surface of the master or inverse mold core. Once the material has set or hardened, the exterior mold assembly can be removed and the material can be peeled off or removed from the inverse mold core or master, again turning the hardened material inside out, to provide a finished skin with a topography matching that of the target object on an exterior surface of the skin.

The method can reduce the amount of work involved in generating a skin, e.g., a reduction of 20 to 30 percent is likely, while providing a skin with the same or even higher quality fine details in its exterior surfaces. In the past, the inner core of a mold assembly was never used to provide such fine details especially to provide a topography and features of a skin's exterior surfaces. The "master" can do what a conventional exterior mold and core did in combination (e.g., by dipping the master in skin-forming material (e.g., rubber or other skin material) or painting the skin-forming material on the master), and it may not even be necessary in many applications to make a mold assembly, such as when a uniform skin thickness is desired.

More particularly, a method is provided for fabricating an artificial skin system. The method includes, from data storage, accessing a digital three dimensional (3D) model of an object. The digital 3D model defines a topography of an exterior surface of the object. The method includes processing the digital 3D model to generate a 3D model of a core, and the processing includes defining an exterior surface of the core with a topography that is an inverse copy of the topography of the exterior surface of the object. Further, the method includes fabricating the core based on the 3D model of the core, whereby the core has an exterior surface corresponding to the exterior surface of the core in the 3D model. The topography of the exterior surface of the object includes a plurality of 3D features, and the inverse copy provides the topography of the exterior surface of the core including inverted versions of the 3D features.

In some embodiments, the method may also include scaling (e.g., adjusting) one or more dimensions of the digital 3D model during the processing step, whereby the one or more dimensions are smaller or larger in the 3D model of the core than in the digital 3D model of the object. The method may also include coating the exterior surface of the fabricated core with skin-forming material in liquid form and, after the skin-forming material has hardened, removing the hardened skin-forming material from the fabricated core including orienting portions of the hardened skin-forming material abutting the exterior surface of the fabricated core to face outward to provide an exterior surface of an artificial skin.

The method may instead include fabricating an exterior mold assembly based on the 3D model of the core. In such cases, the exterior mold assembly is adapted to receive the fabricated core and position the exterior surface of the fabricated core at an offset distance or at two or more offset distances to define a cavity about the exterior surface of the fabricate core. The offset distance and the two or more offset distances are defined based on user input, whereby the user input sets a uniform skin thickness or two or more differing skin thicknesses for the artificial skin. The method may also include positioning the fabricated core in the exterior mold assembly, assembling the exterior mold assembly, injecting skin-forming material in liquid form into the cavity, and, after the skin-forming material has hardened, disassembling the exterior mold assembly and removing the hardened skin-forming material from the fabricated core with a portion of the hardened skin-forming material oriented to face outward to provide an exterior surface of an artificial skin. Still further, the method may include providing a plurality of mounting posts for elastomeric actuation pieces (EAPs) on the interior surfaces of the exterior mold assembly and positioning a set of the EAPs on the mounting posts prior to the injecting of the skin-forming step.

BRIEF DESCRIPTION OF THE DRAWINGS

FIG. 8 is a flow diagram for a process or method of fabricating an exterior artificial skin or skin system (optionally with integrally formed EAPs) for a robotic device or other support structure;

DETAILED DESCRIPTION

Briefly, embodiments of the present invention are directed to fabrication methods for products or items that include skin systems (e.g., robots or other structures/assemblies that incorporate skin systems) for providing extremely realistic looking exterior surfaces with a topography and its features that match an exterior surface of a target object or subject. For example, the target object may be a human hand (or a replica of a human hand) with a topography and features common to a human hand such as lines, ridges, wrinkles, blemishes, fingernails, and so on.

A three dimensional (3D) model of the target object is processed to create a 3D model of the target object that has an exterior surface with an inverted topography (or with a negative version of the topography). The topography is "inverted" in that features that were raised relative to the exterior surface are recessed and features that were recessed are raised. For example, a human knuckle has raised ridges encircling it, and these ridges may be inverted in the new 3D model so as to be valleys. As another specific (but non-limiting) example, a human fingernail may be arcuate in shape and bow outwards, but, in the inverted topography of the new 3D model, the fingernail will be arcuate in shape and bow inwards.

With the new 3D model, a "master" or inverted mold core (or tool) is fabricated with one or more of its exterior surfaces having the inverted topography with the inverted or negative 3D features. The master can be used in a variety of ways to produce a skin or skin system including by dipping the master into skin-forming material (e.g., a container of liquid rubber or the like). Once the material has hardened, a skin is formed simply by removing the material from the master, e.g., by peeling the material off to cause the portion of the skin that was facing/abutting the master's exterior surface to be facing outwards or to be the exterior surface of the skin with a topography matching (or being similar to) the topography of the exterior surface of the target object. In other cases, the master or inverted mold core can be positioned within an exterior mold assembly, liquid skin-forming material can be pumped into the cavity surrounding the core, and the exterior mold assembly can be disassembled once the material has set or hardened. The "skin" is finished as discussed for dipping (or for painting of skin material on the master's exterior surface) simply be peeling the hardened material off of the core such that the portion of the skin that had been abutting the exterior surface of the core is now facing outward to be/provide the exterior surface of the skin. No seam lines are present on this exterior surface (using any of the fabrication processes) so that no (or very limited) post-processing has to be performed to finish the skin.

Figure 1:
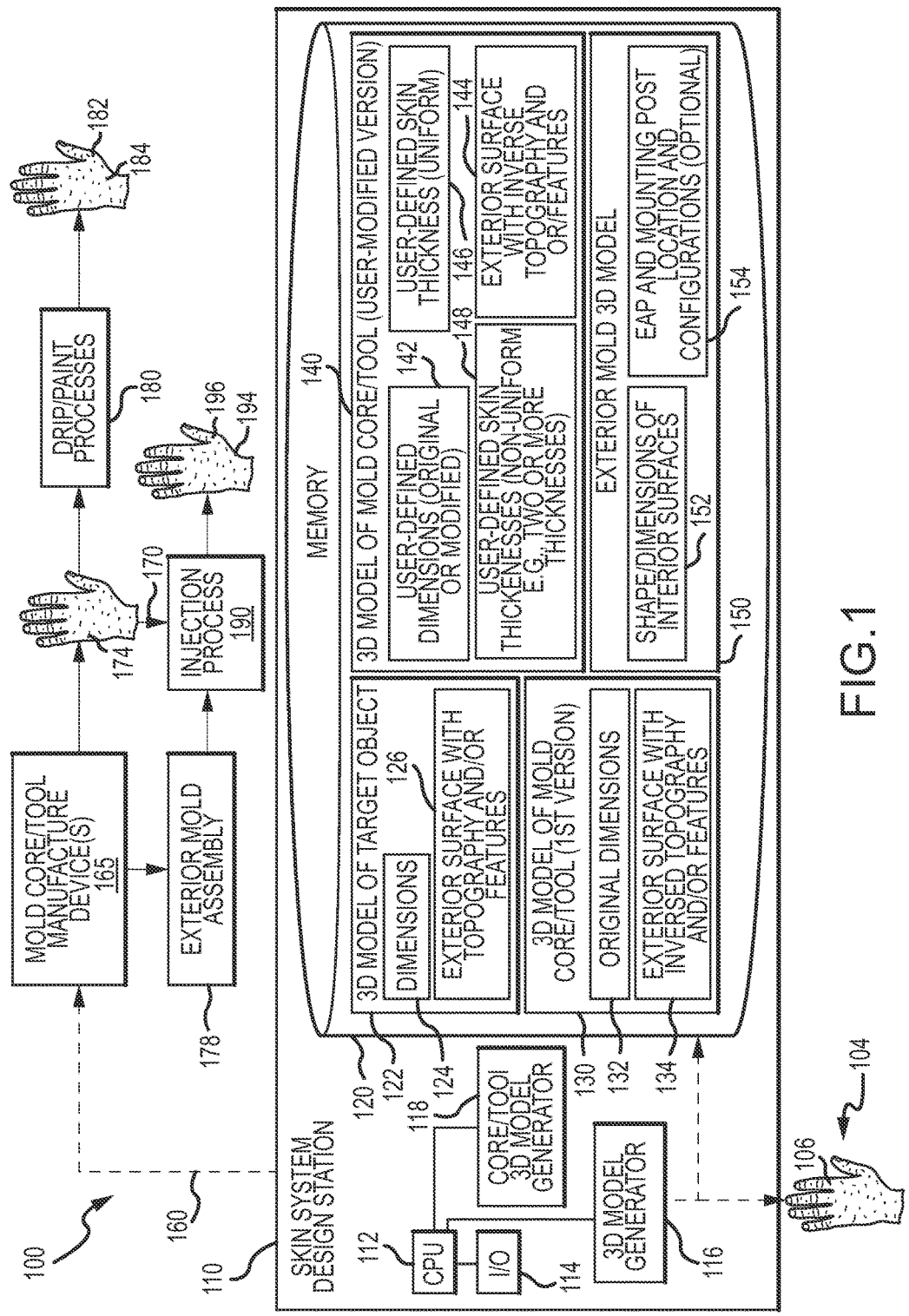
FIG. 1 is a functional block and/or schematic diagram of a skin or skin system fabrication system and process useful for more efficiently fabricating skins or skin systems that are suited for covering robotic devices as well as other uses/applications.

FIG. 1 is a functional block and/or schematic diagram of a skin (or artificial skin system) fabrication system and process 100 useful for more efficiently fabricating skins or skin systems (as shown at 182, 194) that are suited for covering robotic devices (not shown in FIG. 1) as well as for other uses/applications. The system and process 100 may be used to form a skin with a shape based upon a target or source object 104, e.g., human or sculpted hand, a face, an arm, a foot, and so on or nearly any other object for which it is desirable to cover with a skin or skin system. In addition to a particular shape, the target object 104 may have an exterior surface 106 that is not merely smooth but, instead, has a topography with 3D features defined by raised/recessed surfaces.

To fabricate a skin based on the target object 104, a skin design station or fabrication work station 110 is provided. The station 110 may take the form of a computer or computer system that is configured to perform the functions described herein. Particularly, the station 110 includes a processor(s) 112 that manages input/output devices 114, which may take the form of a keyboard, a mouse, voice recognition hardware/software, a monitor/display, a touchscreen/pad, and the like for displaying information (e.g., text, graphics, images, and the like) and receiving user input (e.g., selection of a 3D model for use in generating a 3D model with an inverse or inverted (or negative) topography on one or more exterior surfaces, inputting scaling factors to modify one or more dimensions of the 3D model of the object, inputting thickness values for the skin, and the like). The station 110 also includes or has access to memory (or digital data storage devices) that is managed/operated via processor 112. Software, computer programs, executable code, and the like may be provided in memory 120 and run/executed by the processor 112 to provide a 3D model generator 116 and a master or inverse mold core 3D model generator 118.

The 3D model generator 116 is operated within the station 110 to generate a digital 3D model 122 of the target object 104. For example, the generator 116 may include a 3D scanner or operate to take as input data collected by a 3D scanner, and the scanned data may be used by the 3D model generator 116 to create a 3D model 122 of the target object 104. The 3D model 122 is stored in memory 120 (or otherwise accessible by the station 110), and it defines a set of dimensions 124 for the target object 104 that define its shape and size of the exterior surfaces of the object 104. Further, the 3D model 122 defines an exterior surface 126 of the target object 104 including a topography (with its 3D features) that matches or is based on the exterior surface 106 of the target object 104.

The core 3D model generator 118 is then used during operation of the station 110 to create a 3D model of a core/master that is stored in memory 120 as shown at 130 from the 3D model 122 of the target object 104. The generator 118 may take the form of or include 3D modeling software/programs that are presently available or that may be later developed. The generator 118 may use the dimensions 124 of the 3D model 122 to define a set of original dimensions 132 of the core model 130 so as to define the shape and size of exterior surfaces of the modeled core. The model generator 118 is adapted to process the exterior surface definition 126 in the 3D model 122 to generate a definition 134 of an exterior surface of the modeled core with an inverse topography, e.g., 3D features in the exterior surface definition 126 of the 3D model 122 are inverted (or a negative version of these features is formed for inclusion in the exterior surface definition 134). The 3D model 130 can then be used to form a skin such as to cover a support structure or robotics matching the size and shape of the target object 104 as the skin will have the dimensions (exterior shape and size) of the object 104 along with surface details provided by the exterior surface definition/date 134.

In some cases, though, it may be desirable to modify this first version of the core model 130 such as by scaling one or more of the dimensions up or down or by defining one, two, or more skin thicknesses rather than a uniform, single skin thickness. With this in mind, the model generator 118 may process user input provide via I/O devices 114 (e.g., via a graphical user interface (GUI) provided by the generator 118 in a monitor/display) that may include instructions to enlarge or shrink one or more of the original dimensions 132 to create a set of user-defined dimensions 142 (which may include some of the original dimensions or may apply a scaling factor to all dimensions such as to create an exact replica of the object 104 but that is smaller or larger by some factor). The definition 144 of the exterior surface with the inverse topography is copied from the definition 134 and scaled as needed based on the user-defined dimensions 142.

The user may also provide input that accepts a default skin thickness (or the fabrication, such as dipping or painting, may set skin thickness(es)) to set a uniform thickness 146 of the later-fabricated skin. Alternatively, the user may select or set the thickness 146 for the skin such as at ¹⁄₁₆-inch, ⅛-inch, ³⁄₁₆-inch, or the like. Further, though, the user may modify or define the model 140 by providing input via I/O devices 114 to select two, three, or more skin thicknesses 148 that during later fabrication processes (such as use of a core fabricated based on 3D model 140 with an exterior mold assembly) facilitate providing a non-uniform skin thickness. This may be desirable in many applications such as in skin for covering robotics to obtain a desired (e.g., more realistic) skin movement with the robotics/actuators and/or to increase durability of the skin.

The model generator 118 may also be used during operation of the station 110 to generate or create a 3D model 150 of an exterior mold assembly for later use in fabricating a skin with a core fabricated according to 3D model 130 or 3D model 140. The 3D model 150 of the exterior mold assembly may, for example, define two mold halves that can be assembled about a mold core fabricated according to model 130 or 140, and the 3D model 150 may include a set of data 152 that defines the shape, location, and size of interior surfaces of the exterior mold sections (or halves) that will be used to receive portions of the mold core to support this core and also to define a cavity about portions of the core. The interior surfaces, thus, define the skin thickness or thicknesses as the cavity is used to receive liquid rubber or other skin-forming material when the mold is later assembled and used to fabricate a skin.

In some embodiments, the skin may be formed with integral elastomeric actuation pieces or points (EAPs). In these embodiments of system/process 100, the exterior mold 150 will include data 154 that defines locations of mounting posts (or mounting members as some mounting devices may be magnets or magnetic) on the interior surfaces 152 for receiving the EAPs. An exterior mold assembly fabricated according to the model 150 would then be formed to include the mounting posts and a set or number of EAPs may be provided upon these mounting posts prior to placing the core into the exterior mold sections. Then, when liquid rubber or other material is pumped into the cavity, the EAPs that are positioned by the mounting posts in the cavity become integrally bonded with the skin material and provide attachment or connection points for robotics actuators/drivers or other connectors of a support structure for the skin fabricated using the system/process 100. The design and use of EAPs and mounting posts in a mold assembly are discussed in detail in U.S. Pat. No. 8,568,642, which is incorporated herein by reference.

FIG. 1 further illustrates how these 3D models 130, 140, and 150 can be utilized to produce or fabricate an artificial skin. As shown, the 3D model 130 or 140 optionally along with the exterior mold model 150 is output for use at 160 such as to one or more machining, milling, 3D printer, or other digital-based manufacturing devices 165. The devices 165 are used to fabricate a mold core, tool, or master 170 (e.g., by milling/machining a metal block). The mold core 170 has an exterior surface 174 with a topography that is the inverse or negative of the exterior surface 106 of the target object 104 due to the processes discussed above including inverting 3D features from the 3D model 122 of the object 104. The mold core 170 is formed to have the dimensions 132, 142 defined in the model 130 or 140. As shown, an exterior mold assembly 178 may also be fabricated by the devices 178 based on 3D model 150.

The process 100 may proceed as shown at 180 with using the fabricated core 170 in dip or paint process 180 to produce an artificial skin 182. The artificial skin 182 typically will have a relatively uniform thickness as the liquid skin-forming material adheres to the exterior surfaces 174 of the core 170. When turned inside out or peeled off of the core 170, the skin 182 has the surface 184, which had been contacting/abutting the exterior surface 174 of the core 170, that becomes the exterior or outward facing surface of the skin 182. The exterior surface 184 has a topography that is the inverse or negative of the surface 174 such that it matches or is at least based on (as scaling of dimensions may result in the topography changing to some degree) the exterior surface 106 of the target object 104 but with no seams/ridges as was the case with many prior fabrication processes.

Alternatively, the process 100 may continue at 190 with use of an injection molding process using both the core 170 and the exterior mold assembly 178. With the core 170 placed into the assembled exterior mold assembly 178 (e.g., sandwiched between two mold halves or sections), an elastomer or other skin-forming material is injected or pumped into the cavity adjacent or surrounding the exterior surface 174 of the mold core 170. The material is allowed to set or harden, and the exterior mold assembly 178 is disassembled to provide access to the material-covered core 170. The material is peeled off of the core 170 to provide the skin 194 with the surface 196 that had been facing/abutting the exterior surface 174 of the core 170 being on the outside or exterior.

The exterior surface 196 has a topography that matches or is based on the exterior surface 106 of the target object 104 as it is not inverted or the negative due to the skin-forming material being shaped by the inverse topography and 3D features of the exterior surface 174 of the core 170. The skin 194 has a thickness or thicknesses defined by the model 140 and may optionally include EAPs integrally bonded to the skin material and accessible via the now inner surface of the skin 194 (e.g., the side of the skin 194 that had been exterior/external prior to peeling the skin 194 off of the core 170 and which was facing/abutting the interior surfaces of the sections of the exterior mold assembly 178).

With this understanding of the system/process 100 understood, it may be useful to further describe the use of a core with an exterior surface having an inverse topography with some examples. Particularly, the inventors tested these ideas by creating several core prototypes for creating an artificial skin for a human finger, which has a relatively complex topography with 3D features including a fingernail that provided good proof that a resulting skin has the fine details demanded for many skin applications.

Figure 2:
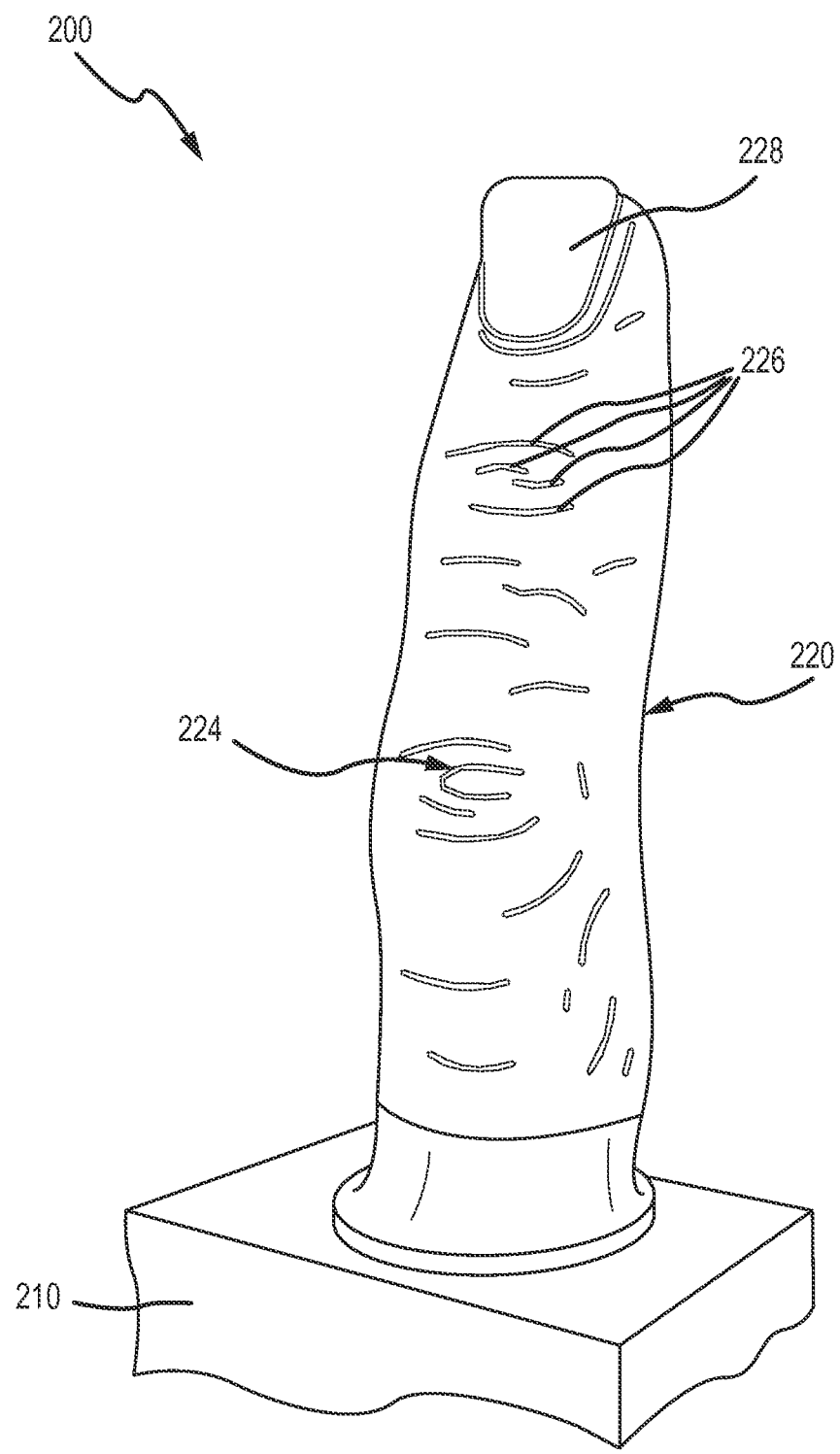
FIG. 2 is a perspective view of a mold core or tool fabricated to have an exterior surface with defining a topography and/or features of an exterior surface of a target object but in an inverse form or configuration (e.g., the inversed topography of a finger in this example)

FIG. 2 is a perspective view of a mold core or tool 200 fabricated to have an exterior surface defining a topography and/or features of an exterior surface of a target object but in an inverse form or configuration (e.g., the inverted or negative topography of a finger in this example. As shown, the core 200 has a base or support block 210 with a body 220 extending outward from the base/block 210 (e.g., the body 220 extends from a first end proximate to the block 210 to a second end distal to the block 210).

The core 200 is fabricated, such as by machined from a block of steel, aluminum, or other metal using computerized numerical control (CNC) or the like, from a 3D model defining a surface with a topography that is an inverse of a topography of a target object (as may be defined by taking a 3D scan of the 3D object or other techniques for 3D modeling an object such as a human finger). As a result, the body 220 has an exterior surface 224 with an inverse topography when compared with the target object. In FIG. 2, the inverse topography can be seen with 3D features 226 and 228, which are inverted versions of the corresponding 3D features on the 3D object. For example, the 3D object 228 is an inverted version of a fingernail on the target object as can be seen with the 3D object 228 having a recessed surface in its center and raised outer edges, which is opposite of a typical human fingernail.

Figure 3:
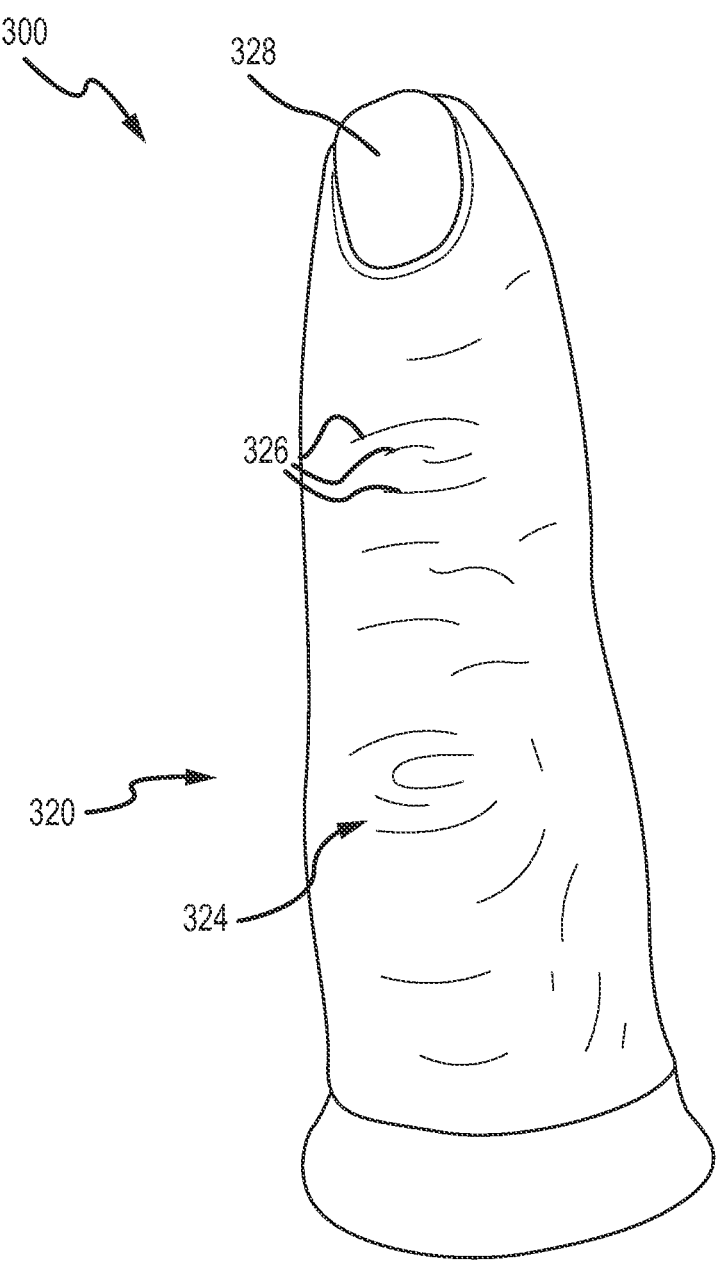
FIG. 3 is a perspective view of a skin (or skin system, as these terms may be used interchangeably herein) fabricated using the mold core or tool of FIG. 2 (e.g., along with an exterior mold assembly when injection molding is used or by itself if dipping/painting is used) and showing the exterior surface of the skin has correct topography (not inversed) when the skin is peeled off or removed from the mold core or tool (without seams)

FIG. 3 is a perspective view of a skin (or skin system, as these terms may be used interchangeably herein) 300 fabricated using the mold core or tool 200 of FIG. 2. For example, the core 200 may be used along with an exterior mold assembly (not shown in FIG. 2) when injection molding is used or by itself if dipping/painting is used. The artificial skin 300 has a hollow body 320 with an exterior surface 324. Significantly, the exterior surface 324 has the fine details of the exterior surface of the target object due to the inclusion of 3D features such as ridges 326 and fingernail 328. FIG. 3 shows that the exterior surface 324 of the skin 300 has correct topography (not inversed) when the skin 300 is peeled off or removed from the mold core or tool 200 and has no seams that would need to be removed. The correct topography is created in surface 324 of the skin body 320 because the surface 324 is formed by placing skin-forming material against the inverted topography of the exterior surface 224 of core 200 and then turning the skin inside out to have the surface 324 being the outer or exterior surface.

As discussed with reference to FIG. 1, it may be desirable to generate more than one core based on the 3D model of the target object. This may be useful for fabricating skin systems that have similar topographies and 3D features but having differing physical characteristics such as a version of a skin covering a smaller or larger version of the 3D object. This may be achieved by allowing a user of the design station and its software to provide a 3D model of a core that has an exterior surface with an inverse topology and, at least initially, the exterior dimensions of the target object. Then, the user may be allowed to modify or change one or more of the dimensions or to apply a scaling factor to all dimensions (e.g., multiply the dimensions all by a common multiplier such as 0.5, 0.75, 1.25, 1.5, 2.0, and the like to make a skin that will fit a support structure or underlying robotics of a smaller or larger version of the target object).

Figures 4A, 4B:
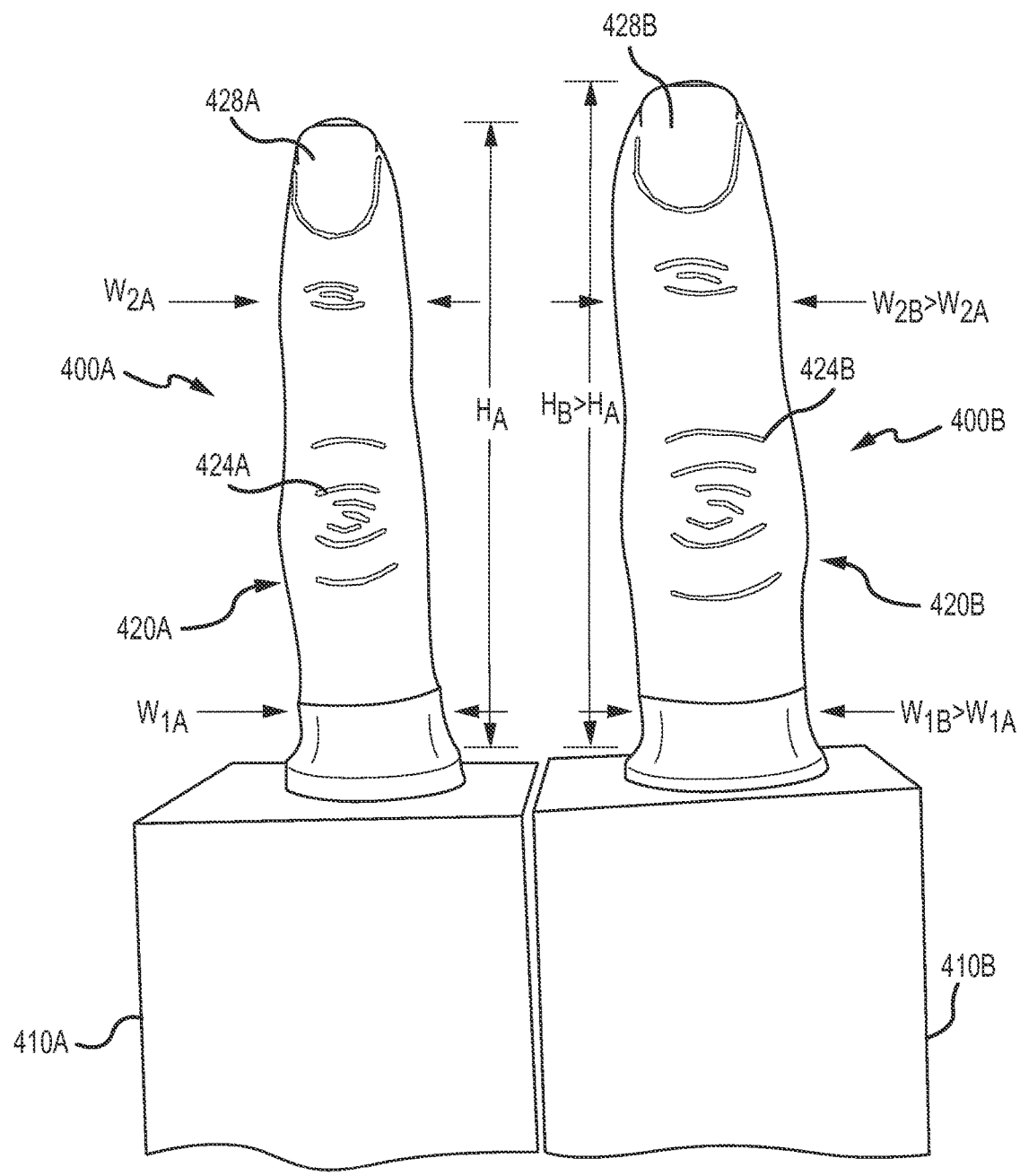
FIGS. 4A and 4B illustrate additional mold cores/tools for fabricating a skin or skin system, e.g., of a finger, and illustrating how a single 3D model can be used as a base or as input to create two or more cores/tools with differing dimensions (e.g., exterior dimensions such as lengths, widths, heights, outer diameters, and the like may be original or modified with user input/definitions) but matching or similar topologies (e.g., same shapes for an exterior feature with variance in size (e.g., a smaller or larger or elongated/stretched version of the original topography or feature))

With this in mind, FIGS. 4A and 4B illustrate additional mold cores/tools 400A and 400B for fabricating a skin or skin system, e.g., skin to cover a finger. The cores 400A and 400B are fabricated using first and second versions of a 3D model of a core formed from a single 3D model of a target object so that each has an inverse topology on its exterior surface even though dimensions or scaling is changed or varies between the two core versions 400A, 400B. As shown, each core 400A, 400B includes a block or support base 410A, 410B and a body 420A, 420B extending outward from the block/base 410A, 410B. Further, each body 420A, 420B has an exterior surface 424A, 424B, respectively, that has a topology that is the inverse of or that is an inverted form of a topology of an exterior surface of the target object. This can be seen with 3D feature 428A, 428B, which in this example is an inverted fingernail.

While the inverse topology and its 3D features are matching (or similar), the two cores 400A and 400B differ as dimensions of exterior features or surfaces of the bodies 420A and 420B differ from each other. In this example, the body 424A has a height, $H_A$, that may or may not match that of the target object, and the body 424B has a height, $H_B$, that differs from height, $H_A$, e.g., is greater in this example. Further, the body 424A has first and second widths (or outer diameters), $W_{1A}$ and $W_{2A}$, at two locations along the body (or associated with two differing portions of the body 424A) while the body 424B has corresponding first and second widths (or outer diameters), $W_{1B}$ and $W_{2B}$, at corresponding locations that differ (e.g., are greater than the similar dimensions of exterior surfaces of the body 424A). In this way, the cores 400A and 400B can be used to fabricate two skins that will have exterior surfaces with topographies that match or are similar in shape/configuration but differ in some dimensions. FIGS. 4A and 4B illustrate that using system 100 or a similar system a single 3D model can be used as a base or as input to create two or more cores/tools with differing dimensions (e.g., exterior dimensions such as lengths, widths, heights, outer diameters, and the like may be original or modified with user input/definitions) but with matching or similar topographies (e.g., same shapes for an exterior feature with variance in size (e.g., a smaller or larger or elongated/stretched version of the original topography or feature)).

Figure 5:
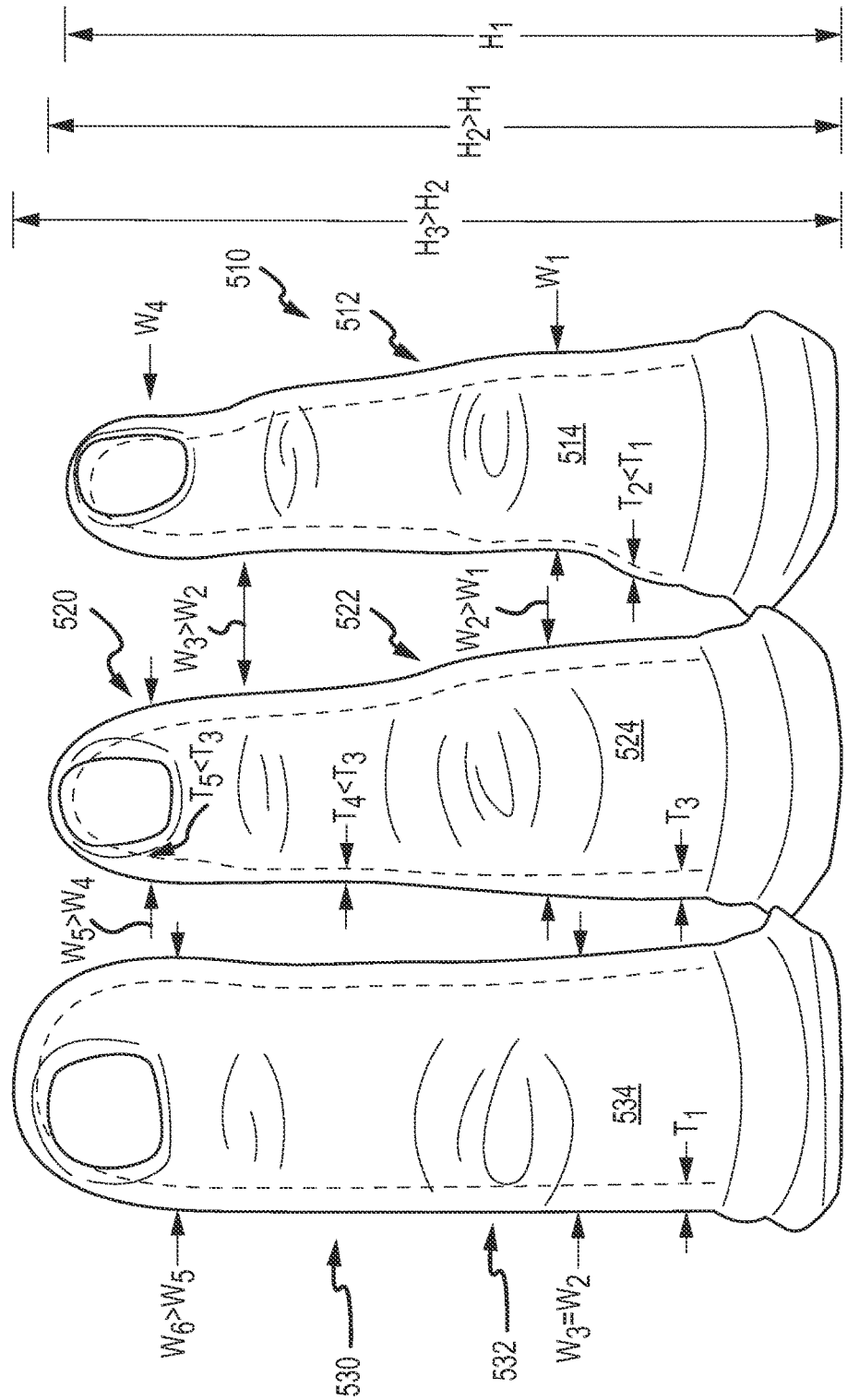
FIG. 5 shows three skins or skin systems fabricated from a single 3D model but with differing dimensions and user-defined wall thicknesses for its body, e.g., a uniform thickness that may be user defined or two or more wall thicknesses that may also be user-defined/selected, achievable by building the same or differing cores/tools from the 3D model and/or building the same or differing exterior mold assemblies (e.g., to define skin thicknesses)

FIG. 5 shows three skins or skin systems 510, 520, 530 fabricated from three differing cores fabricated from a single 3D model of a target object. The cores, though, differed from each other in at least one dimension of an exterior surface or feature. Further, injection molding or other fabrication processes were used to provide differing thicknesses of the skins 510, 520, 530 (such as based on user selected uniform or varying thickness values). As shown, each skin 510, 520, 530 has a body 512, 522, 532 with an exterior surface 514, 524, 534 that was formed by applying liquid skin-forming material (e.g., an elastomer) to an exterior surface of three different cores with similar or matching (but differing in one or more dimension) inverse topographies.

The cores differed in at least one dimension such that the bodies 512, 522, 532 differ, too, in at least one dimension. As shown, the body 512 of the first skin 510 has a height, $H_1$, and widths, $W_1$ and $W_4$, measured at two spaced-apart locations on the body 512, and these dimensions may match or differ from those of the target object. As shown, the body 522 of the second skin 520 has a height, $H_2$, that is greater than the height, $H_1$, of the first skin body 512 and widths, $W_2$ and $W_5$, measured at two spaced-apart locations on the body 522 corresponding to similar locations on body 512 that are greater than the widths, $W_1$ and $W_4$, of the first skin body 512. Further, the body 532 of the third skin 530 has a height, $H_3$, that is greater than the height, $H_2$, of the second skin body 522 and widths, $W_3$ and $W_6$, measured at two spaced-apart locations on the body 532 corresponding to similar locations on body 522 that are equal to and greater than, respectively, than the widths, $W_2$ and $W_5$, of the second skin body 522. The variances in these dimensions of exterior portions or surfaces is achieved even though a single 3D model was the source of the three cores used to form the skins 510, 520, 530 by varying dimensions of the models used to form the cores.

As discussed above, the thickness of a skin formed using a core of the present description can be varied by setting one or more offset distances between an interior surface of an exterior mold assembly (or its two halves/sections) exterior surfaces of a received mold core. This is shown with body 532 of the skin 530 being hollow with an outer wall having a uniform thickness, $t_1$, with body 522 of the skin 520 being hollow with an outer wall having at least three differing thicknesses, $t_3$, $t_4$, and $t_5$ (with, in this example, t4 being less than $t_3$ and $t_5$ being greater than $t_3$), and with body 512 of the skin 510 being hollow with an outer wall having a uniform thickness, $t_2$ that differs from (e.g., is less than) the uniform thickness, $t_1$, of the skin 530.

Figure 6:
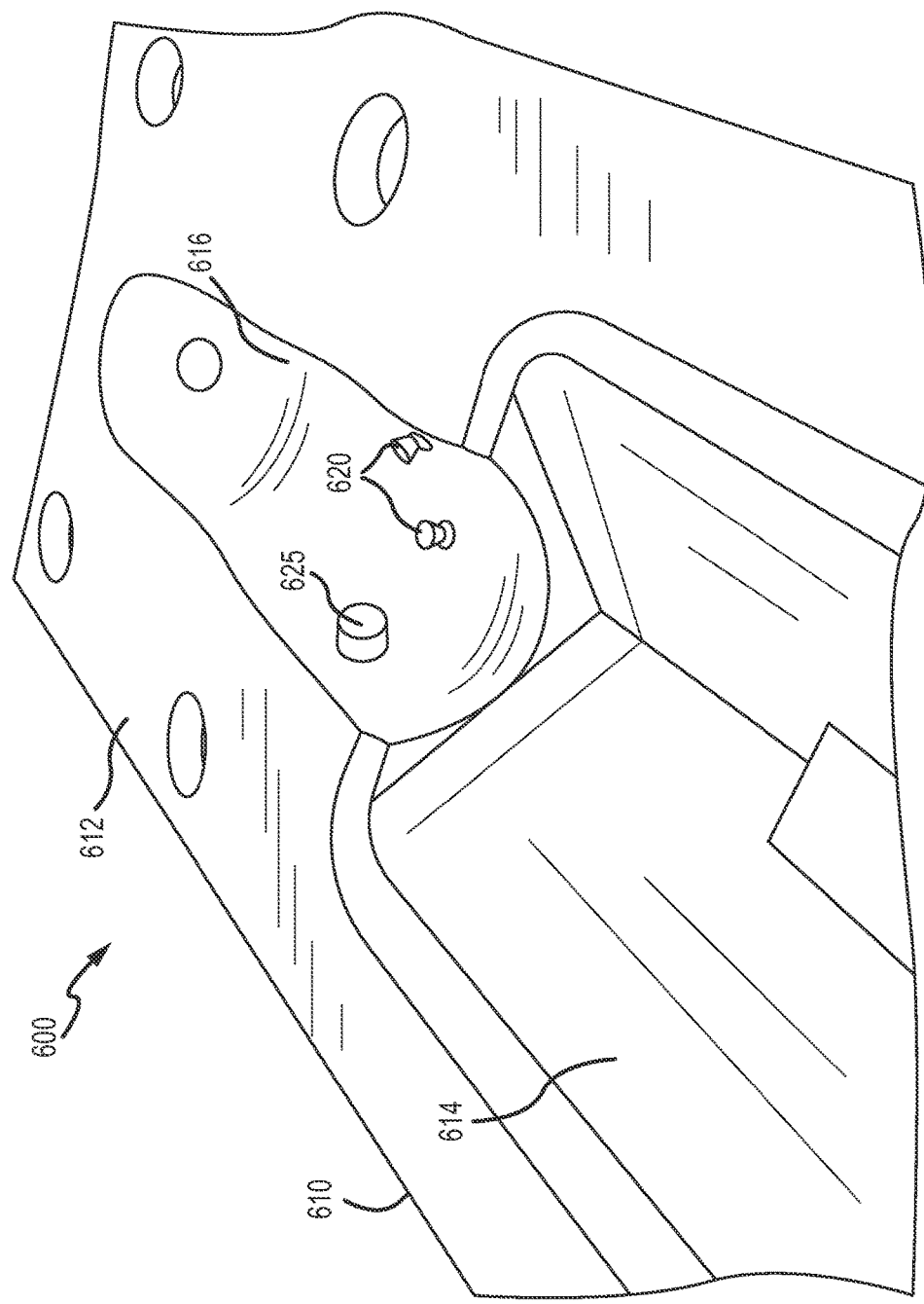
FIG. 6 illustrates a half or section of an exterior mold assembly for use with a mold core or tool, such as the core/tool shown in FIG. 2, and showing provision of elastomeric actuation pieces or points (EAPs) in the exterior mold assemblies interior surfaces so as to provide the EAPs on interior surfaces of a skin or skin system formed using the exterior mold assembly of FIG. 6.

As discussed above, the cores, such as core 200 of FIG. 2, may be used to form an artificial skin when used in combination with an exterior mold assembly in an injection molding process. FIG. 6 shows a section or half 600 of such an exterior mold assembly, and the mold section/half 600 includes a body 610 with an inner mating surface 612 that would mate with a similar surface of the other section or half (not shown) of the exterior mold assembly so as to enclose a core and define a cavity about exterior surfaces of the received core.

As shown, a first interior surface 614 (recessed surface) is provided on inner mating surface 612 that is sized and shaped to receive and hold or support a base/block of a core, e.g., with dimensions that match or are only slightly larger than outer dimensions of the core block/base. A second interior surface 616 (recessed surface) is provided on the inner mating surface 612 adjacent the block receiving surface 614 and is shaped and sized to receive the body of a core. Also, the interior surface 616 is sized to be spaced apart at least one distance from an exterior surface of the core body so that a cavity is formed in the assembled mold assembly between the interior surface 616 and the exterior surface of the core for receiving liquid skin-forming material with the offset distance or distances defining the thickness or thicknesses of a skin formed using the mold section 600.

In this example, a number of mounting posts 620 are provided on the second interior surface 614 and each post 620 is configured to receive and support an EAP 625. The location of each mounting post 620 is chosen to position a corresponding EAP 625 at a mounting or connection point for a skin formed using the mold section 600 onto a support structure (e.g., drivers of robotics covered by such a skin), and the EAPs including EAP 625 will be integrally bonded to the skin and be accessible on an interior or inner surface/side of the skin as the side/surface of the skin formed on or against the interior surface 616 of the mold section 600 will be used as the interior or inner skin surface (e.g., with the exterior skin surface formed upon an exterior surface of a core received in the surfaces 614, 616).

Figure 7:
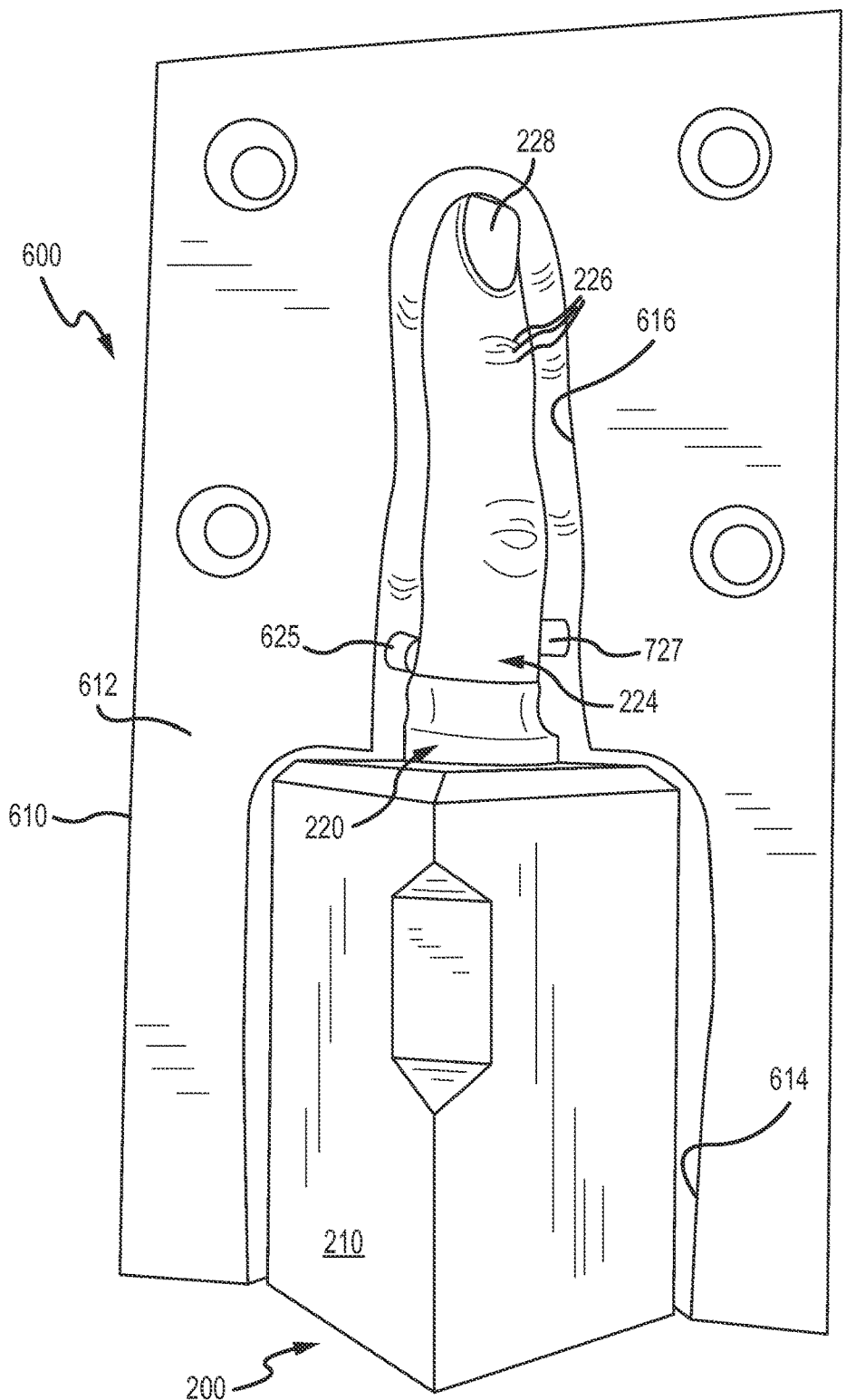
FIG. 7 illustrates the section of the exterior mold assembly of FIG. 6 with the mold core/tool of FIG. 2 positioned therein to define a cavity about the exterior surfaces of the body of the core/tool for receiving skin-forming material during injection molding.

FIG. 7 illustrates the mold section 600 of an exterior mold assembly after the mold core 200 has been received. Particularly, the core base/block 210 is received on and is abutting the first interior surface 614 of the body 610 of the exterior mold section/half 600. This causes the body 220 of the core 200 to be supported so as to be suspended over the interior surface 616. The exterior surface 224 with the inverse topography including inverted 3D features 226, 228 is spaced apart an offset distance (if a uniform skin thickness is to be formed) or two or more offset distances (if a non-uniform or varying skin thickness is to be formed). As shown, a cavity or open volume is defined by the offset distance(s) about the exterior surface 224 of the body 220 for receiving skin-forming material during injection molding processes. EAPs 625, 727 in this cavity are spaced apart from the exterior surface 224 so as to not ruin or affect fine details produced in the exterior surface of the skin, and the EAPs 625, 727 will integrally bond with the material pumped into the cavity about exterior surface 224 and be flush with the interior or inner side or surface of the artificial skin (e.g., when the skin material is peeled off (turned inside out from the orientation originally found when the mold assembly is opened)).

FIG. 8 is a flow diagram for a process or method 800 of fabricating an exterior artificial skin or skin system (optionally with integrally formed EAPs) for a robotic device or other support structure. The method 800 may be implemented, at least in part, by operation of the work station 110 of FIG. 1. The method 800 starts at 805 such as with choosing a skin to fabricate, e.g., a skin to cover a particular robotics device, and obtaining an object for use in modeling the cores/tools used to fabricate the skin. For example, a sculpted or 3D printed copy of a robotic hand or a human hand may be obtained or chosen in step 805. In step 805, it may also be useful to select materials for the skin, to decide what type of skin fabrication process will be used (dipping, painting, injection molding, or the like). Step 805 may also involve determining whether EAPs will be included in the skin and their location/design.

The method 800 continues at 810 with obtaining or creating a 3D model of the target object. For example, a 3D scan may be performed for a sculpted model that will capture details of the topography and its 3D features of an exterior surface of the sculpted model. The method continues at 814, such as with a 3D modeling program run by one or more processors of a work station or other computing device, with generating a 3D model of a core/tool/master based on the 3D model of step 810. Step 814 includes generating at least one exterior surface that has a negative or inverse version of the topography of the exterior surface of the original 3D model of step 810.

Then, at 820, the method 800 determines whether or not a user has provided input to change or modify one or more dimensions (model size/shape definitions) of the 3D model of the core. If not, the method 800 can continue with step 830. If yes, the method 800 continues at 826 with generating a modified 3D model of a core with the inverse topography on the exterior surface but with scaling or sizing being performed (e.g., with a 3D modeling program or the like) to implement the dimension changes provided in step 820.

At 830, the method 800 continues with setting a skin thickness for a skin to be formed with a core fabricated with the core model from step 814 or 826. A user may define, e.g., via a GUI provided on a monitor/display of the work station by the 3D modeling or other software, a uniform skin thickness or may choose to assign two or more skin thicknesses including defining which portions of the skin body will have such thicknesses. Then, at 840, a core/tool/master is fabricated based on the 3D model of the core from step 814 or step 826 if dimensions were modified from the original 3D model. This may involve using the 3D model of the core to operate a milling or machining device or to operate a 3D printer.

The method 800 may then proceed with step 850 to apply a layer of skin material onto the exterior surface of the core from step 840 such as using dipping, painting, or other coating techniques with a liquid (e.g., a liquid elastomer). At step 854, it is determined whether or not the material applied in step 850 has hardened or set, and, if not (e.g., a predefined amount of time at a particular range of temperatures has past), step 854 is repeated. If hardened/set, the method 800 continues at 858 with peeling off or removing the skin material from the core to form the skin (with the material contacting the exterior surface oriented to face outward or to be the exterior surface of the skin). Since no seams are present on the exterior surface of the skin, there is no need for a post-processing step to remove seams/ridges and the method 800 can end at 890.

In some embodiments (not shown in FIG. 8), an additional step may be performed prior to step 858. In these embodiments, the core with the layer of skin material formed in step 850 is placed into an exterior mold assembly with a cavity formed between interior surfaces of the mold assembly sections and the exposed surface of the skin material on the core. The interior surfaces may be offset from the core's exterior surface a distance chosen to implement the thicknesses defined in step 830. EAPs may optionally be mounted on posts or magnetic mounting elements on the interior surface. Then, a skin material may be injected or pumped into the cavity, and this skin material may be the same as used for the step 850 or may differ so as to provide two layers in the skin. Typically, the skin material may be chosen to provide a different softness or other material property than that of the layer (outer layer) provided in step 850. For example, the inner layer provided by the injection molding may be a harder material when hardened than the material provided in step 850 for the skin's outer layer (e.g., have a higher measurement on the durometer scale of hardness in the inner layer than the outer layer). The two materials may differ but are selected to achieve bonding of the second/inner layer with the first/outer layer as part of the injection molding process. Once the material hardens/sets, the mold assembly can be disassembled and step 858 can be performed so as to provide the surface of the two-layered skin that was against the core as the exterior surface of the artificial skin.

Alternatively, the method 800 may continue at 860 with fabricating an exterior mold assembly with interior surfaces for receiving the core and for defining a cavity to implement the skin thicknesses defined in step 830. The interior surfaces may also be fabricated to include mounting posts for EAPs, and, if so, EAPs may be positioned onto these mounting posts in step 860. The method 800 continues at 862 with placing the core into the exterior mold section(s) with or without EAPs on the interior surfaces adjacent the exterior surface of the body of the core. The exterior core assembly is then assembled. The spacing between the exterior surface of the core body and adjacent interior surfaces of the exterior mold assembly sections/halves provides a cavity for receiving a volume of skin-forming material and its thickness defines the thickness or thicknesses of a formed skin (e.g., the thicknesses set in step 830).

Then, in step 864, liquid skin-forming material is injected or pumped into the cavity in the mold assembly about the exterior surfaces of the core body. Step 866 involves determining whether the material has hardened or set, and, if not, step 866 is repeated. If hardened/set at step 866, the method 800 continues at 868 with disassembling the mold assembly and removing the core with the hardened/set skin material on its exterior surfaces. Step 868 also includes removing the skin material from the core and turning it inside out so that the surface/side of the skin material against the core faces outward or is oriented to be the exterior surface/side. At this point, the artificial skin is finished as no seam removal or other post-processing is required and the skin's exterior surface includes fine details as found in the target object used in step 810. The method 800 may then end at step 890 (such as by attaching the skin from step 868 (or step 858) onto a support structure such as over a portion of a robotics assembly).

To further explain the present skin fabrication method, it may be useful to further describe an exemplary skin formed using a mold core or tool of the present description. FIGS. 9A-9D illustrate a skin system or skin 900 as may be fabricated using the techniques taught herein showing, respectively, the skin 900 as it appears upon hardening and while still on the mold core (not shown but may take the form of core 200 shown in FIGS. 2 and 7), a cross section of the skin 900 as it would be oriented on the mold core (not showing the core), the skin 900 as it appears after being turned inside out as part of removing it from the mold core, and a cross section of the skin 900 after its removal from the core mold.

Figure 9A:
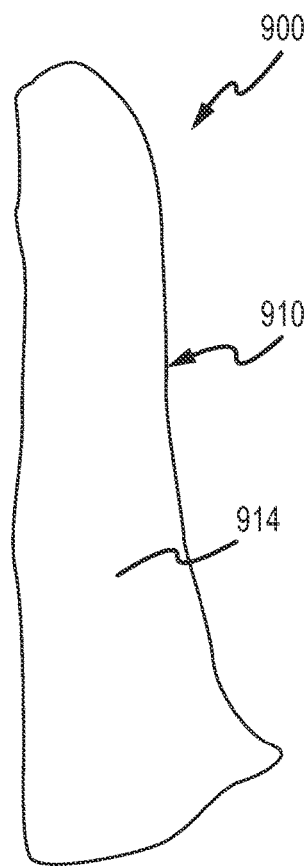
FIGS. 9A-9D show a skin system as may be fabricated using the techniques taught herein showing, respectively, the skin as it appears upon hardening and while still on the mold core, a cross section of the skin as it would be oriented on the mold core (not showing the core), the skin as it appears after being turned inside out as part of removing it from the mold core, and a cross section of the skin after its removal from the core mold.

In FIG. 9A, the skin 900 is shown as it would appear upon formation or hardening upon a mold core or tool, e.g., after material dipping/painting or removal or an exterior mold to expose the skin 900. The skin 900 includes a body 910, and when initially formed on the mold core, the surface 918, which is typically smooth (due to a smooth inward facing wall of the exterior mold or due to dipping/painting processes), is facing outward, and this surface 918 is the "inner" surface of the finished skin 900 (as shown in FIGS. 9C and 9D).

Figure 9B:
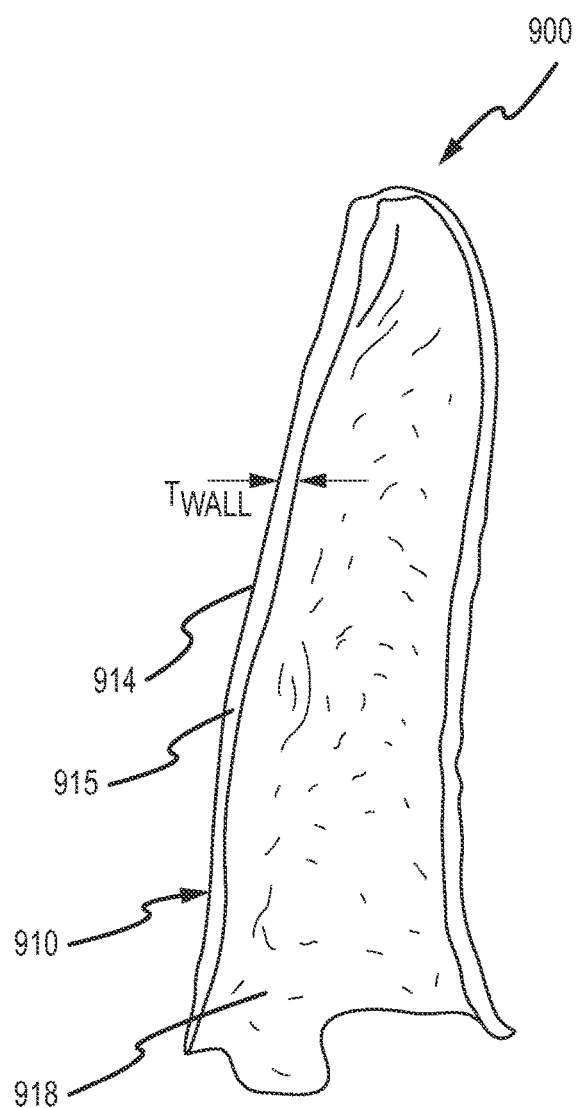

In FIG. 9B, a cross sectional view of the skin 900 oriented as shown in FIG. 9A is provided. As shown, the body 910 is formed of an outer wall 915 that extends about an enclosed space/volume (e.g., defined by the size and shape of the mold core, not shown). The wall 915 has a thickness, $t_{Wall}$, that is shown to be uniform throughout the body 915 such as may be the case when the skin 900 is formed through dipping/painting of liquid material on a core or when a uniform offset is set for an inner surface of an exterior mold that is used to define a space about a core's outer surface prior to injecting liquid material into a mold assembly. As shown in FIG. 9B, surface 914 is facing inward—or toward where an exterior surface of a mold core would be located if shown. The surface 914 provides the "exterior" surface of the finished skin 900 as can be seen in FIGS. 9C and 9D. The surface 914 has a 3D topography (or roughness) providing fine detail (in many case) as defined by the mold core and in contrast to smooth surface 918.

Figures 9C, 9D:
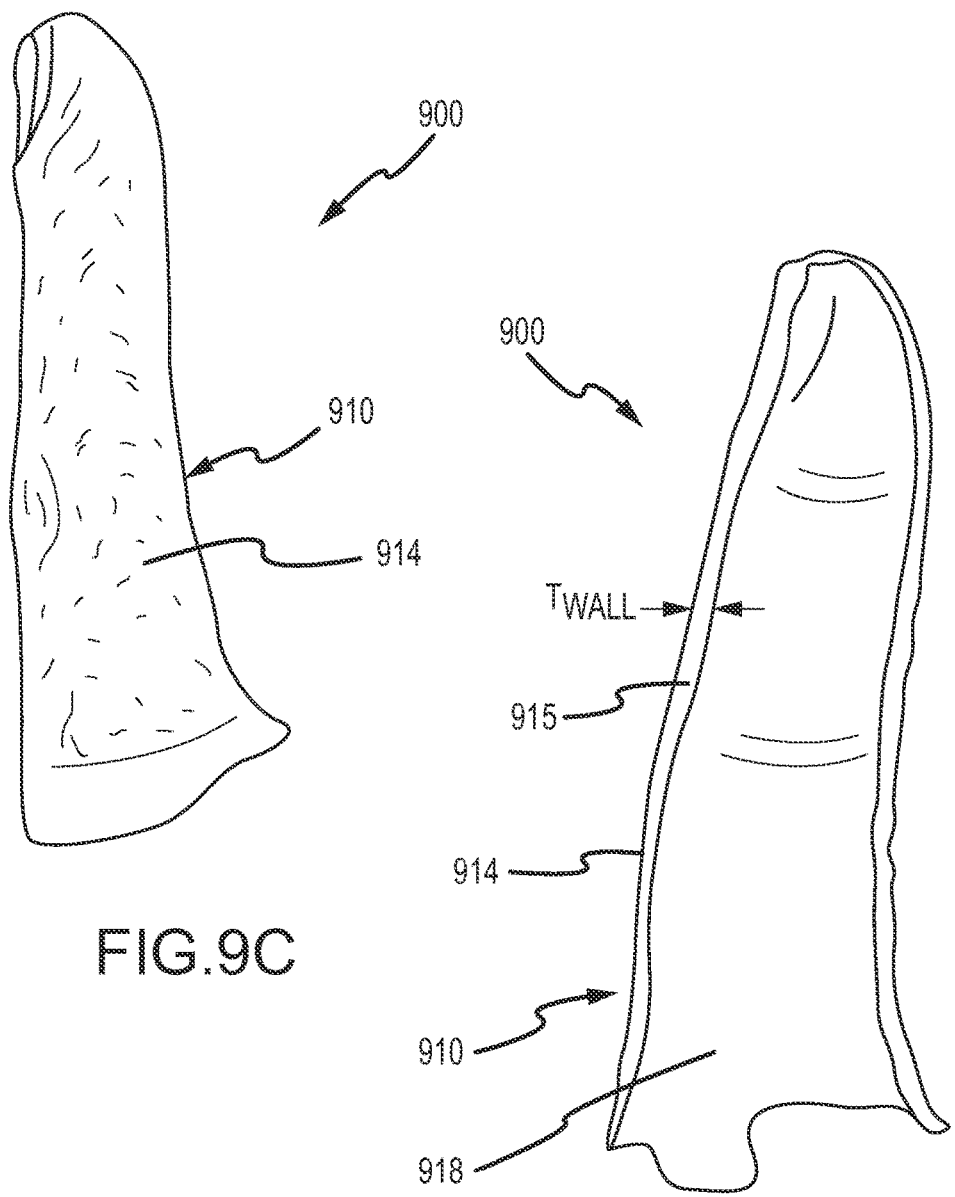

FIG. 9C provides a view of the skin 900 after the hardened material forming its body 910 is removed from a mold core and is turned inside out to expose the exterior surface 914 of the skin 910. FIG. 9D shows a cross section of the skin 900 oriented as shown in FIG. 9C, and, as shown, the smooth inner surface 918 is now facing inward while the rough or finely textured outer surface 914 is facing outward (e.g., to show a fingernail, wrinkles/lines, fingerprint, and so on of skin on a human finger). The smooth surface 918 would be placed over and contact robotic assemblies or other support structures that benefit from covering with the skin 900.

FIGS. 9A to 9D show a skin 900 with a wall 915 defining a body 910 with a uniform thickness, but, as discussed above, the thickness, tWall, may vary along the portions of the wall 915 (e.g., to facilitate bending, to provide more material in robotic-contacting portions, and so on). Also, it will be understood that the thickness, tWall, can readily be set by using a single mold core and using two or more differing exterior portions of the mold to define differing offsets from the mold core's exterior surface (i.e., the surface that defines the topography of the exterior surface of a skin fabricated using the core).

Figure 10:
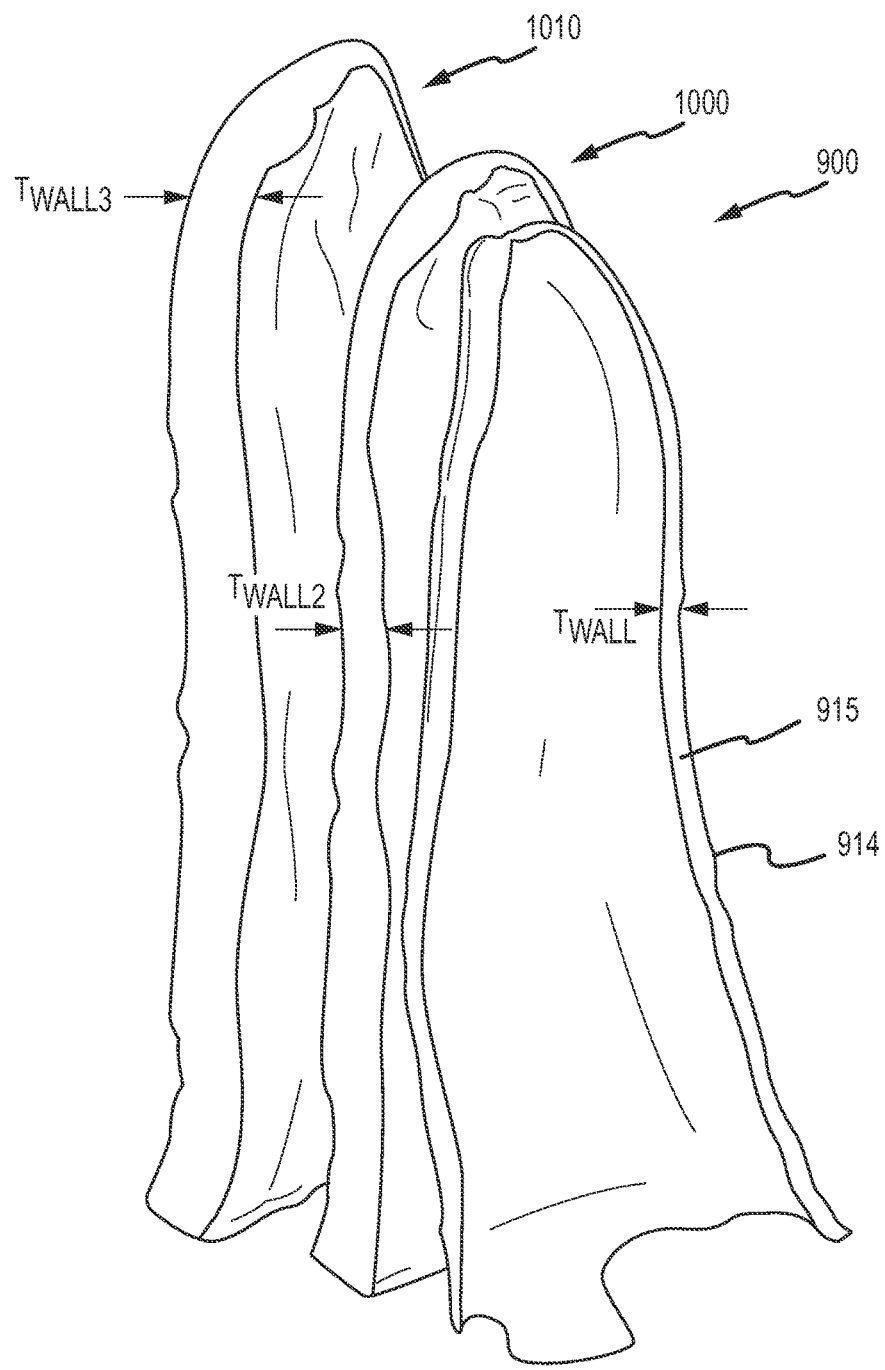
FIG. 10 illustrates cross sectional views of two additional skins with the skin of FIGS. 9A-9D showing that a single core can be used to produce multiple skins with differing skin thicknesses and similar exterior surface topographies.

For example, the mold core 200 may be used to form a plurality of skins each having a different wall thickness (which may be uniform or vary within a single skin). FIG. 10 illustrates a cross sectional view of the skin 900 with a first wall thickness, tWall. Also, though, FIG. 10 shows a second skin 1000 with a second wall thickness, tWall2, that is greater than the first wall thickness, tWall. This may be achieved using the same mold core (such as core 200 of FIG. 2) but with first and second exterior mold portions that define two differing offsets from the core. Further, FIG. 10 shows a third skin 1010 that has a third wall thickness, tWall3, that is greater than the second wall thickness, tWall2, and this is achieved, again by using the same core but a third exterior mold portion configured to provide a larger offset when the core is received in the exterior mold portion (e.g., to define a larger space in which more skin material may be injected). Each of the skins 900, 1000, and 1010 has matching (or similar) exterior topographies on the exterior skin surface, though, due to the use of a single mold core.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The fabrication method may use a variety of rapid prototyping techniques once a core model is created such as using a CAD-based 3D computer modeling program/routine. Cores may be fabricated using aluminum or other alloys or materials and using precise, high-speed CNC machining such as three-axis CNC milling or other techniques.

The above examples have provided examples of using skin systems of the invention with robotics, but the skin or covering systems of the invention are, of course, readily adaptable and useful in other applications in which it is desirable to cover a still or rigid frame or support structure or a dynamic or movable frame or support structure such as with materials having two or more hardnesses or differing flexibility and/or durability. As a result, the use of the term "skin" is not intended as being limited to human or animal imitating robots, toys, or devices, but it is instead to be inclusive of nearly any covering assembly or layered overlay that may be applied to or used as a covering (typically, but not always, an external covering).

In the assembled product or apparatus (e.g., the robotic character), the skin system with integral EAPs may be supported by structural members not shown in the figures (but similar in form as the core) including an inner shell or frame formed of rigid materials (such as plastic or fiberglass) to simulate rigid support found in nature such as a skull or other bone. The robotics may be housed within this support shell and extend through the shell to engage the skin system, e.g., the force receiving component, to manipulate the skin system to create desired animation such as facial expressions or speech. The support shell and driving/actuating robotics include mounting posts/elements similar in configuration and location to those found on the core such that the EAPs readily mount the skin to the robotics assembly (shell and internally positioned/housed components). Use of multiple EAPs (including a combination of locking and load-spreading EAPs) for the skin results in more realistic movement of the skin such as less obvious point source pushing and pulling where the robotics engage the skin system and such as skin distal to the robotic actuator connection points better simulating human and other skin in that it moves more as expected than prior skin systems.

The robotic assembly or robotics may include typical robotic software, hardware, and mechanical mechanisms and linkages used to perform programmed or controllable movements. In this regard, the robotics, for example, may include a mouth mechanism or a mechanism for simulating movements of a mouth, and, as such, include manipulators or skin driving members (e.g., upper and lower jaw or roof of mouth and bottom of mouth simulating elements extending from driving devices in robotics). The particular arrangement and configuration of the robotics is not limiting to the invention as the skin systems fabricated according to techniques of the invention may be used with numerous robotics or other devices such as those that impart force to provide a desired response (or look and feel) or that simply provide a skin/cover over a structural assembly.

In one embodiment, a hard shell or support frame may be included in the robot head to provide the structure of the head and to provide physical support for a soft skin system and to contain and hide the robotics. The hard shell may be rigid and is typically formed of a material such as a plastic (such as a polycarbonate/ABS mix or the like) but metals and/or alloys may also be used to form the shell. The shell may include a sidewall generally in the shape of the head (or skull) of the creature being simulated by the robot head.

As discussed, the skins with the integral EAPs may be created with a mold combined with a core of the present description and pouring a variety of materials into that mold to form its shape or casting the part. The poured/injected materials are generally elastic materials, but this is not required to practice the invention as it may be useful to provide a more rigid component with one or more components that are rigid. However, typically the components of the skin system will be elastic and flexible to allow manipulation by robotics. The materials used for the EAPs are chosen to be compatible to bonding integrally within surrounding skin material during the molding and pouring processes. The materials may be the same or differ for the EAPs and skin, with some embodiments choosing the same material but differing hardnesses for the EAPs and skin. The material may be a plastic or, more typically a polyurethane or rubber.

It may be desirable to have the EAPs have differing hardnesses to achieve desired wear and desired movements. Hardness herein is intended to relate in part to flexibility or level of elasticity with EAPs (or portions of such EAPs) having a higher value of hardness being less elastic (and vice versa). Hardness is generally the resistance of a material to localized deformation and may apply to deformation from indentation, scratching, cutting, or bending. For elastomers, rubbers, and some polymers (that may be used for components in skin system), hardness may be thought of as the resistance to elastic deformation of the surface.

We claim:

1. A method for fabricating an artificial skin system, comprising:
    from data storage, accessing a digital three dimensional (3D) model of an object, wherein the digital 3D model defines a topography of an exterior surface of the object;
    processing the digital 3D model to generate a 3D model of a core, wherein the processing comprises defining an exterior surface of the core with a topography that is an inverse copy of the topography of the exterior surface of the object;
    fabricating the core based on the 3D model of the core, whereby the core has an exterior surface corresponding to the exterior surface of the core in the 3D model;
    coating the exterior surface of the fabricated core with skin-forming material in liquid form; and
    after the skin-forming material has hardened, removing the hardened skin-forming material from the fabricated core including turning the hardened skin-forming material inside out to orient portions of the hardened skin-forming material abutting the exterior surface of the fabricated core to face outward to provide an exterior surface of an artificial skin free of seam lines.

2. The method of claim 1, wherein the topography of the exterior surface of the object includes a plurality of 3D features and wherein the inverse copy providing the topography of the exterior surface of the core includes inverted versions of the 3D features.

3. The method of claim 1, further comprising scaling one or more dimensions of the digital 3D model during the processing step, whereby the one or more dimensions are smaller or larger in the 3D model of the core than in the digital 3D model of the object.

4. A method for fabricating an artificial skin system, comprising:
    from data storage, accessing a digital three dimensional (3D) model of an object, wherein the digital 3D model defines a topography of an exterior surface of the object;
    processing the digital 3D model to generate a 3D model of a core, wherein the processing comprises defining an exterior surface of the core with a topography that is an inverse copy of the topography of the exterior surface of the object;
    fabricating the core based on the 3D model of the core, whereby the core has an exterior surface corresponding to the exterior surface of the core in the 3D model;
    fabricating an exterior mold assembly based on the 3D model of the core, wherein the exterior mold assembly is adapted to receive the fabricated core and position the exterior surface of the fabricated core at an offset distance or at two or more offset distances to define a cavity about the exterior surface of the fabricate core;
    positioning the fabricated core in the exterior mold assembly, assembling the exterior mold assembly, injecting skin-forming material in liquid form into the cavity; and after the skin-forming material has hardened, disassembling the exterior mold assembly and removing the hardened skin-forming material from the fabricated core including turning the hardened skin-forming material inside out to orient a portion of the hardened skin-forming material to face outward to provide an exterior surface of an artificial skin.

5. The method of claim 4, further comprising providing a plurality of mounting posts for elastomeric actuation pieces (EAPs) on the interior surfaces of the exterior mold assembly and positioning a set of the EAPs on the mounting posts prior to the injecting of the skin-forming step.

6. The method of claim 4, wherein the offset distance and the two or more offset distances are defined based on user input, whereby the user input sets a uniform skin thickness or two or more differing skin thicknesses for the artificial skin.

7. A method for fabricating an artificial skin system, comprising:
    processing a digital three dimensional (3D) model of an object to generate a 3D model of a core, wherein the digital 3D model defines a topography of an exterior surface of the object and wherein the processing comprises defining an exterior surface of the core with a topography that is an inverse copy of the topography of the exterior surface of the object;
    fabricating the core based on the 3D model of the core, whereby the core has an exterior surface corresponding to the exterior surface of the core in the 3D model;
    coating the exterior surface of the fabricated core with skin-forming material in liquid form or positioning the fabricated core in an exterior mold assembly, assembling the exterior mold assembly, and injecting skin-forming material in liquid form into the cavity; and
    after the skin-forming material has hardened, removing the hardened skin-forming material from the fabricated core including turning the hardened skin-forming material inside out to cause portions of the hardened skin-forming material abutting the exterior surface of the fabricated core to face outward to provide an exterior surface of an artificial skin, the exterior surface being free of seam lines.

8. The method of claim 7, wherein the topography of the exterior surface of the object includes a plurality of 3D features and wherein the inverse copy providing the topography of the exterior surface of the core includes inverted versions of the 3D features.

9. The method of claim 7, further comprising providing a plurality of mounting posts for elastomeric actuation pieces (EAPs) on an interior surfaces of the exterior mold assembly and positioning a set of the EAPs on the mounting posts prior to the injecting of the skin-forming step.

10. The method of claim 7, wherein the offset distance and the two or more offset distances are defined based on user input, whereby the user input sets a uniform skin thickness or two or more differing skin thicknesses for the artificial skin.

11. A method for fabricating an artificial skin system, comprising:
    accessing a digital three dimensional (3D) model of an object, wherein the digital 3D model defines a topography of an exterior surface of the object;
    processing the digital 3D model to generate a 3D model of a core, wherein the processing comprises defining an exterior surface of the core with a topography that is an inverse copy of the topography of the exterior surface of the object;
    scaling two or more dimensions of the digital 3D model using two or more differing scaling factors during the processing step, whereby the two or more dimensions are smaller or larger in the 3D model of the core than in the digital 3D model of the object; and
    fabricating the core based on the 3D model of the core, whereby the core has an exterior surface corresponding to the exterior surface of the core in the 3D model.

12. The method of claim 11, wherein the topography of the exterior surface of the object includes a plurality of 3D features and wherein the inverse copy providing the topography of the exterior surface of the core includes inverted versions of the 3D features.

13. The method of claim 11, further comprising coating the exterior surface of the fabricated core with skin-forming material in liquid form and, after the skin-forming material has hardened, removing the hardened skin-forming material from the fabricated core including orienting portions of the hardened skin-forming material abutting the exterior surface of the fabricated core to face outward to provide an exterior surface of an artificial skin.

14. The method of claim 11, further comprising fabricating an exterior mold assembly based on the 3D model of the core, wherein the exterior mold assembly is adapted to receive the fabricated core and position the exterior surface of the fabricated core at an offset distance or at two or more offset distances to define a cavity about the exterior surface of the fabricate core.

15. The method of claim 14, further comprising positioning the fabricated core in the exterior mold assembly, assembling the exterior mold assembly, injecting skin-forming material in liquid form into the cavity, and, after the skin-forming material has hardened, disassembly the exterior mold assembly and removing the hardened skin-forming material from the fabricated core with a portion of the hardened skin-forming material oriented to face outward to provide an exterior surface of an artificial skin, wherein the offset distance and the two or more offset distances are defined based on user input, whereby the user input sets a uniform skin thickness or two or more differing skin thicknesses for the artificial skin.

* * * * *